United States Patent Office 3,730,905
Patented May 1, 1973

3,730,905
METHOD OF ENVELOPING THE PARTICLES OF A DISPERSED PHASE
Gotz Koerner, Essen, and Gerd Rossmy, Essen-Werden, Germany, assignors to Th. Goldschmidt AG, Essen, Germany
No Drawing. Continuation of abandoned application Ser. No. 796,932, Feb. 5, 1969. This application June 4, 1971, Ser. No. 150,227
Int. Cl. B01j 13/02; B44d 1/02
U.S. Cl. 252—316                                     10 Claims

ABSTRACT OF THE DISCLOSURE

Process of enveloping the particles of a phase dispersed in water by forming a boundary layer—capable of stabilization—around the particles. During or after the preparation of the dispersion, emulsifiers containing at least one hydrophilating group and at least one silyl group having at least one hydrolyzable group attached to the silicon atom of the silyl group, are added, whereupon the hydrolyzable groups are hydrolyzed and the silanols thus formed are condensed. If only a single hydrolyzable group is present, the dispersion is enriched by a silane containing hydrolyzable groups. The hydrophilating group is selected from the group consisting of polyethylene oxide units, quaternary ammonium salt groups and amino salt groups of sulfuric acid esters in which the sulfuric acid ester group is linked to a silicon atom of the siloxane structure through carbon. The hydrolyzable groups are halogen, acyloxy, alkoxy, $\equiv$Si—N=,

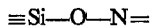

or

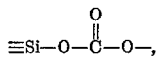

wherein the free valences at N and O are satisfied by hydrocarbon.

CROSS-REFERENCE TO PRIOR APPLICATION

This is a continuation of application Ser. No. 796,932 filed Feb. 5, 1969, now abandoned.

FIELD OF INVENTION

The invention relates to a process for enveloping the particles of a dispersed phase by the formation of a boundary layer around the particles, said boundary layer being capable of stabilization.

DESCRIPTION OF THE PRIOR ART

Various processes have become known in the art for the purpose of enveloping the particles of a dispersed phase by the formation of a stabilizable surface film or jacket layer.

According to one of the prior art procedures, as for example exemplified by German Auslegeschrift 1,096,-038, a polymerizable monomer is dissolved in an oil which does not dissolve the polymer product, whereupon the solution of the monomer in the oil is dispersed in a polar liquid and the monomer is polymerized. In so doing, the formed polymer migrates from the inner phase and is deposited at the boundary layer of the dispersed phase to form a coating or jacket layer enveloping the dispersed particles.

According to the teachings of a second known procedure, as for example disclosed in German Auslegeschrift 1,180,347, the phenomenon of coacervation is used for causing the desired envelopment. In this process, a sol of one or several polymers is separated into a polymer-rich and a polymer-poor liquid phase. The coacervation product appears initially as a fine dispersion of microscopically small droplets of the polymer in the liquid which latter is in a state of equilibrium. If extraneous substances are present in this dispersion, the coacervation product closes around these substances and encapsulates them. The enveloping polymer compound may then be stabilized in a suitable manner.

DESCRIPTION OF THE INVENTION

It has now been found that the particles of a dispersed phase in whicht he dispersion medium is water, can be successfully enveloped by adding certain surface active substances during or after the preparation of the dispersion. These surface active substances, due to their boundary surface activity, accumulate at the boundary surface of the dispersed particles and, due to a subsequent chemical reaction, are transferred into a higher molecular state. This principle is realized in accordance with this invention by utilizing the reactivity of hydrolyzable groups attached to a silicon atom.

Briefly, the inventive procedure is characterized by adding, during or after the preparation of the dispersion, surface active substances which contain at least one silyl group having at least one hydrolyzable group attached to the silicon atom as terminal group. According to one embodiment of the invention, and provided more than one hydrolyzable group is attached to the same silicon atom, the hydrolyzable groups are hydrolyzed and the silanols thus formed are condensed. According to an alternative embodiment, of the invention, and provided one or several hydrolyzable groups are attached to the same silicon atom, first equimolar amounts, calculated on the hydrolyzable group or groups, of a silane of the formula $$R^1_y \, Si \, R^2_{4-y}$$

are added to the dispersion, whereafter the hydrolyzable groups are hydrolyzed and the formed silanols condensed. In the above formula, $R^1$ stands for a hydrolyzable group, preferably alkoxy with up to four carbon atoms, $R^2$ is a monovalent hydrocarbon, preferably methyl, and $y=3$ or 4.

The hydrolysis results first in the formation of silanol groups which readily condense to form a SiOSi linkage under simultaneous splitting off of water. With a view to obtaining cross-linking in the boundary layer, it is necessary that either more than one hydrolyzable group is attached to the same silicon atom or, if only a single hydrolyzable group is available at the silicon atom, cross-linking silanes with three or four hydrolyzable groups are added, whereby the surface active substances are linked to each other. The addition of silanes containing several hydrolyzable groups may, however, also be effected if surface active substances are to be cross-linked whose silyl terminal groups exhibit more than one hydrolyzable groups. In the latter case, however, the addition of silanes is not absolutely required.

As hydrolyzable groups, halogen atoms linked to the silicon, as well as acyloxy and alkoxy groups are suitable. The hydrogen halide which is liberated from silicon-halogen groups upon hydrolysis is, however, a disturbing factor for some purposes. For this reason, it is preferred in the inventive procedure to use hydrolyzable groups in which alkoxy or acyloxy is bonded to the silicon. Within the alkoxy groups, those which readily hydrolyze are most suitable. This means that particularly alkoxy of 1–4 carbon atoms is preferred. Also substituted alkoxy groups are suitable, particularly groups whose substituents increase the compatability with water. Examples are:

—OCH$_2$CH$_2$NH$_2$ and 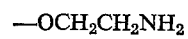

Other hydrolyzable groups which are suitable for the inventive procedure are, for example, groups of the following structure

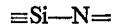

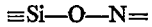

and

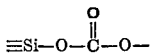

The free valences at the nitrogen and oxygen atoms are satisfied by hydrocarbon groups which may be substituted. A hydrogen atom may also be linked to the nitrogen atom.

The speed of the hydrolysis of the hydrolyzable groups at the silicon atom is dependent on the nature of the group and varies accordingly. The hydrolysis may be accelerated by raising or lowering the pH value in a manner known per se. The same applies for the condensation reaction which, however, is not accelerated by changing the pH value, but rather by the addition of suitable known catalysts such as, for example, dibutyltindilaurate.

According to a preferred embodiment of the inventive process, the surface active substances are composed of compounds having at least one terminal group of the general formula

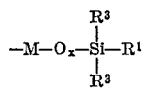

wherein $R^1$ has the above meaning and $R^3=R^1$ or is hydrocarbon, particularly methyl, or corresponds to the formula

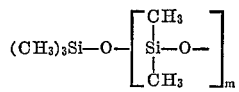

wherein $m=0$ to 100, preferably 0 to 10, and wherein a portion of the methyl groups, preferably not more than 33%, may be replaced by other hydrocarbon groups, which may be substituted, preferably by ethyl, vinyl or phenyl. M is a divalent hydrocarbon, while $x=0$ or 1.

Surface active substances to be used in the inventive procedure may, for example, be prepared by reacting surface active substances having at least one hydroxyl group with allyl chloride. The hydrogen chloride thus formed is advantageously neutralized while the allyl ether formed is subjected to an addition reaction in a manner known per se with a hydrogen silane having one or several hydrolyzable groups. However, it is also possible to condense the hydroxyl group or groups of the surface active substance with a halogen silane having one or several hydrolyzable groups. In so doing, it is of particular advantage to react the halogen silane with a secondary hydroxyl group of the surface active substance. As hydroxyl group containing surface active substances, polyalkyleneglycolmonoethers of suitable alcohols are particularly suitable. Alkyl phenols, alkanols as, for example, fatty alcohols or alcohols of the oxosynthesis lend themselves well for this purpose. However, alkylene oxide addition products to multivalent alcohols may also be employed. Such products are, for example, alkylene oxide addition products of sorbitan fatty acid ester.

Examples of such emulsifiers which form gels with the formation of siloxane linkages and which are organic in the hydrophobic moiety can be characterized by the following formulae:

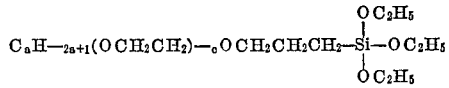

$a=12$ to 22
$c=2$ to 30

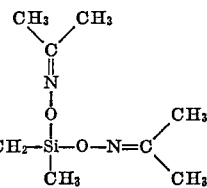

$b=11$ to 21
$c=2$ to 30

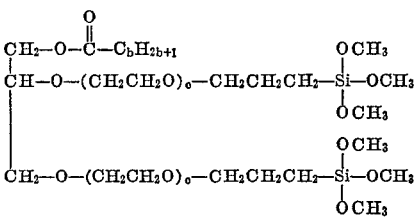

$b=11$ to 21
$c=2$ to 30

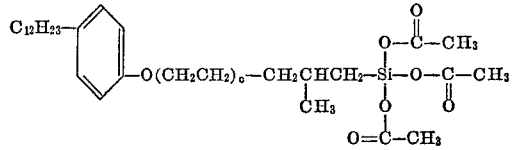

$c=2$ to 30

Particularly useful products for the inventive purposes are those which contain fluor atoms in the hydrophobic molecule moiety. An example of such compounds can be represented by the following formula

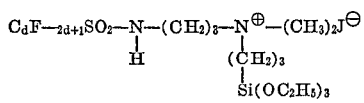

wherein J stands for iodine and
$d=6$ to 12.

Another preferred embodiment of the inventive procedure is characterized in that methyl siloxanes are used as surface active substances which in addition to hydrophilating groups contain one or several $R^1$ groups attached to the silicon.

Examples of such hydrophilating groups are the salt groups, particularly the amino salt groups of sulfuric acid esters of polysiloxanes in which the sulfuric acid ester group is linked to a silicon atom of the siloxane structure through carbon. The preparation of such compounds has been disclosed, for example, in U.S. Pat. No. 3,109,012. Suitable compounds of this kind can be represented by the following formula

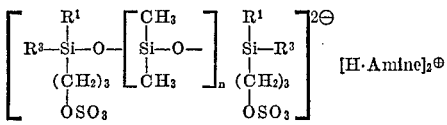

wherein $R^1$ and $R^3$ have the indicated meaning, and $n$ is larger than 3, preferably between 8 and 200.

Other suitable surface active substances which contain the polysiloxane structure are compounds of the formula

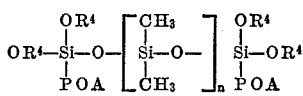

In this formula, $n$ has the indicated meaning, $R^4$ is a hydrocarbon with preferably 1 to 4 carbon atoms and the group POA indicates a polyoxyalkylene which is linked to the polysiloxane structure through an SiC linkage. The polyalkylene glycol group consists of ethylene oxide and/or propylene oxide. The polyalkylene glycol group, at the end which is not connected with the polysiloxane structure, carries the group $OR^5$ wherein $R^5$ is hydrogen, hydrocarbon or

Further, surface active non-iogenic silicon tensides of the following formula are suitable for the inventive purposes

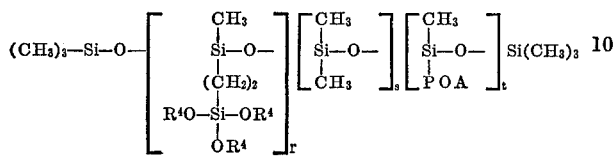

In this formula, $R^4$ and POA have the indicated meaning, $r \geq 1$, $s = 0$ to 200, and $t \geq 1$.

In carrying out the inventive process, the surface active substances to be employed are used in quantities sufficient that at least one monomolecular layer of these compounds can form on the dispersed particles. If the surface active substances to be employed themselves have sufficient dispersing properties, then the compounds themselves may be used as dispersing agents. However, it is possible to prepare the dispersion proper with conventional surface active substances and thereafter to enrich the formed dispersion with the inventive substances. Of course, known measures for facilitating the formation of emulsions, such as the use of auxiliary solvents as, for example, ethanol or acetone, may be used.

The inventive procedure results in the formation of dispersions or emulsions in which the particles are provided with an envelope or coating which may be subjected to substantial mechanical wear without damage. The wear or stresses to which the particles may be subjected without destruction may be much greater than can be withstood by prior art boundary layers of the indicated kind. In this manner, emulsions of increased stability are obtained. The inventive procedure makes it possible to envelop dispersed particles in such a stable manner that the particles subsequently may be separated from the continuous phase in the form of a powder. This can be accomplished by filtration or spray drying. Such powders thus constitute micro-capsules which may accommodate, for example, adhesives, dyes, drugs or solvents. These microcapsules yield their content upon application of pressure. In other words, if the micro-capsules are subjected to pressure sufficient to break the capsule walls, the interior content of the capsules is liberated. Such microcapsules have attained considerable importance, for example, in the field of copying papers and adhesives.

The inventive enveloping procedure will now be described by several examples, it being understood, however, that these examples are given by way of illustration and not by way of limitation and that many changes may be effected without affecting in any way the scope and spirit of the invention as recited in the appended claims.

EXAMPLE 1

A mixture of the following ingredients was prepared:

225 g. of a methyl silicone oil of 20 cp.
25 g. of an emulsifier and
250 g. of ethanol.

500 g. of water were added to the mixture under stirring. The mixture thus obtained was thereafter homogenized. The emulsifier was a substance of the formula

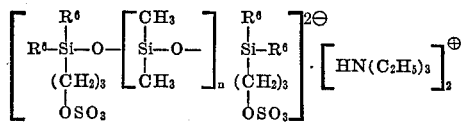

A: $R^6 = OC_2H_5$  $n=30$
B: $R^6 = CH_3$  $n=30$

Finally, the aqueous phase was adjusted to a pH value of 3 to 4. The emulsion, which was produced with the emulsifier A, is much more stable than the emulsion produced with emulsifier B.

EXAMPLE 2

245 parts by weight of water were added under vigorous stirring to a solution consisting of 112.5 parts by weight of a short-chain methyl silicone oil (15 cp.),
125 parts by weight of ethanol,
5 parts by weight of methyltriethoxysilane and
12.5 parts by weight of an emulsifier of the formula

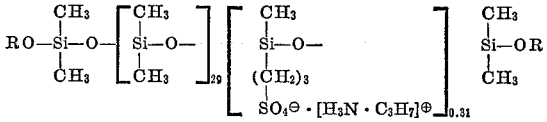

The initial emulsion formed in this manner is homogenized by passing the emulsion once through an emulsifier of the slot type. For the purpose of initiating the crosslinking reaction between the emulsifier and the methyl silanol which is formed in the emulsion by hydrolysis of the methyltriethoxysilane, the pH of the emulsion is adjusted to a value of 4 by adding a few drops of diluted hydrochloric acid. The dilution rate was 1:5. The emulsion was then stored for 24 hours at room temperature. The stability of the emulsion was then determined by storing at 70° C. No change in the emulsion was observed after more than 50 hours.

EXAMPLE 3

An emulsion was prepared from a solution consisting of 112.5 parts by weight of a short-chain silicone oil (15 cp.),
125 parts by weight of ethanol,
10 parts by weight of methyltriethoxysilane and
12.5 parts by weight of the emulsifier of Example 2, by adding to the solution 240 parts by weight of water according to the procedure disclosed in Example 2.

The hydrolysis of the methyltriethoxysilane and the cross-linking reaction between the emulsifier and the methylsilanol formed during the hydrolysis is initiated by the addition of a few drops of monoethanolamine. For this purpose, the emulsion is first adjusted to a pH value of 8. This emulsion may be stored for more than 50 hours at 70° C. without any change in the emulsion.

EXAMPLE 4

250 parts by weight of water were added in the manner described in Example 2 to a solution consisting of 112.5 parts by weight of a short-chain silicone oil (15 cp.),
125 parts by weight of ethanol and
12.5 parts by weight of the emulsifier disclosed in Example 2.

This resulted in the formation of an emulsion which does not contain any cross-linking agents for the emulsifier. Considerable oil separation from the emulsion was observed after heating for 17 hours at 70° C.

What is claimed is:

1. A process of forming a stabilized emulsion with particles of a phase dispersed in water, wherein a boundary layer, capable of stabilization, is formed around the particles, which comprises:
    (1) adding to the aqueous dispersion, either during its formation or thereafter, an emulsifier containing at least one hydrophilating group and at least one terminal silyl group having at least one group which is hydrolyzable under the conditions of the process and which is attached to the silicon atom of the silyl group, and provided more than one hydrolyzable group is attached to the same silicon atom
(2) hydrolyzing said groups to form silanols, and
(3) condensing said silanols or—provided a single hydrolyzable group is attached to the same silicon atom
(4) adding prior to said hydrolysis and condensation a silane of the formula $$R_y^1 Si R_{4-y}^2$$

wherein $R^1$ is a hydrolyzable group, $R^2$ is monovalent hydrocarbon and $y=3$ or 4, said silane being added in equimolar amounts calculated on said hydrolyzable group attached to said silicon atom, said emulsifier being added to the aqueous dispersion in an amount sufficient to form at least a monomolecular layer on the dispersed particles, said hydrophilating group being selected from the group consisting of polyethylene oxide units, quaternary ammonium salt groups and amino salt groups of sulfuric acid esters of polysiloxanes in which the sulfuric acid ester group is linked to a silicon atom of the siloxane structure through carbon, said group which is hydrolyzable under the conditions of the process being selected from the group consisting of halogen, acyloxy, alkoxy, ≡Si—N=, ≡Si—O—N= and

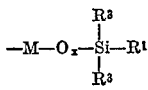

wherein the free valencies at N and O are satisfied by hydrocarbon.

2. A process as claimed in claim 1, wherein the emulsifier is a compound having at least one terminal group of the formula $$-M-O_x-\underset{R^3}{\underset{|}{\overset{R^3}{\overset{|}{Si}}}}-R^1$$

wherein $R^1$ is a hydrolyzable group being alkoxy of 1–4 carbon atoms, and $R^3$ is alkoxy of 1–4 carbon atoms, methyl or

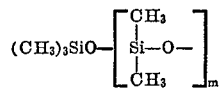

wherein $m=0$–10, not more than 33% of the methyl groups being replaced by ethyl, vinyl or phenyl, M is divalent hydrocarbon and $x=0$ or 1.

3. A process as claimed in claim 1, wherein step (4) is carried out when more than one hydrolyzable group is attached to said silicon atom.

4. A process as claimed in claim 1, wherein $R^1$ is alkoxy of 1–4 carbon atoms.

5. A process as claimed in claim 1, wherein $R^2$ is methyl.

6. A process as claimed in claim 1, wherein said hydrolyzable group is alkoxy of 1–4 carbon atoms, —OCH$_2$CH$_2$NH$_2$ or —O(CH$_2$CH$_2$O)$_{1-5}$CH$_3$.

7. A process as claimed in claim 1, wherein the speed of the hydrolysis of step (2) is accelerated by adjustment of the pH value of the dispersion.

8. A process as claimed in claim 1, wherein the speed of the condensation of step (3) is accelerated by the addition of a catalyst.

9. A process as claimed in claim 8, wherein the catalyst is dibutyl tin dilaurate.

10. A process as claimed in claim 1, wherein the emulsifier is a methylsiloxane which, in addition to said hydrophilating group, contains at least one hydrolyzable group attached to silicon.

References Cited
UNITED STATES PATENTS

| | | | |
|---|---|---|---|
| 3,551,346 | 12/1970 | Breen et al. | 252—316 |
| 2,985,554 | 5/1961 | deMonterey et al. | 260—46.5 R X |
| 2,512,192 | 6/1950 | Yen et al. | 424—32 |
| 2,800,457 | 7/1957 | Green et al. | 252—316 |
| 3,354,095 | 11/1967 | Burzynski et al. | 252—316 |

RICHARD D. LOVERING, Primary Examiner

U.S. Cl. X.R.

8—79; 117—100 A; 252—312; 264—4; 424—32